Figure 1:
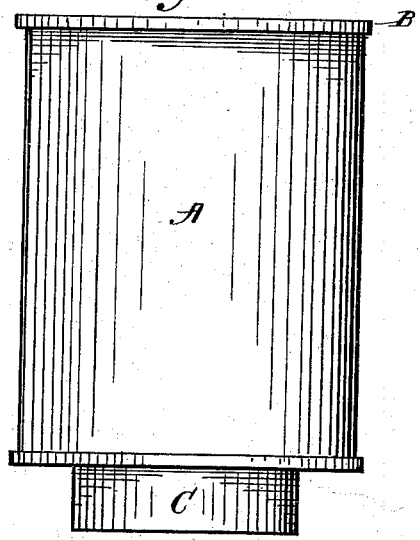

(No Model.)

V. MANUEL.
VESSEL FOR FOOD AND OTHER ARTICLES.

No. 263,928. Patented Sept. 5, 1882.

Witnesses:
C. S. Hyer
George W. Rea

Inventor:
Victor Manuel
By James L. Norris
Atty

UNITED STATES PATENT OFFICE.

VICTOR MANUEL, OF LONDON, ENGLAND.

VESSEL FOR FOOD AND OTHER ARTICLES.

SPECIFICATION forming part of Letters Patent No. 263,928, dated September 5, 1882.

Application filed July 25, 1882. (No model.) Patented in Germany January 24, 1882, No. 18,915; in France February 23, 1882, No. 147,525; in Belgium March 9, 1882, No. 57,301, and in England May 4, 1882, No. 2,094.

*To all whom it may concern:*

Be it known that I, VICTOR MANUEL, a citizen of Switzerland, residing at London, England, have invented certain new and useful Improvements in Vessels for Food and other Articles, (for which I have received Letters Patent in the German Empire, No. 18,915, dated January 24, 1882; in France, No. 147,525, February 23, 1882; in Belgium, No. 57,301, March 9, 1882, and in Great Britain, No. 2,094, May 4, 1882,) of which the following is a specification.

My invention relates to the preservation of liquid or semi-liquid articles of diet or medicaments, and to the construction of vessels or recipients for articles thus preserved.

Heretofore milk, coffee and milk, chocolate and milk, and other similar articles intended for human consumption, have been condensed or concentrated and inclosed in sealed tin-plate casings or recipients, and such condensed or concentrated articles require to be diluted in boiling water or submitted to some other previous culinary treatment in order to enable them to be consumed.

The object of my invention is, first, to render preserved liquid or semi-liquid articles of diet or medicaments suitable for direct consumption without requiring any kind of previous culinary process except that of heating; and, second, to provide the necessary appliance for performing such heating process.

To carry my invention into effect I inclose in the usual description of tin-plate casings, or "tins," as they are habitually called, either milk in its natural condition, or coffee and milk, chocolate and milk, soups, pharmaceutical preparations, or any other article of diet ready for direct consumption; and, having hermetically sealed up the recipients or tins referred to, I place them in boiling water for such a period of time as may be required to prevent their contents from losing their purity or dietetic virtues, however long they may be kept within the tins or recipients before being used, and to whatever part of the globe they may be conveyed. To each tin or recipient I solder or otherwise fasten a second hermetically-sealed casing containing either cotton impregnated with liquid fuel or any other suitable description of combustible matter sufficient in quantity to heat the contents of the tin or recipient, which heating is effected by partially pulling out and kindling the contents of the second casing.

In the accompanying drawings I have illustrated the construction of the vessel by means of which I propose to attain the objects of my invention.

Figure 2:
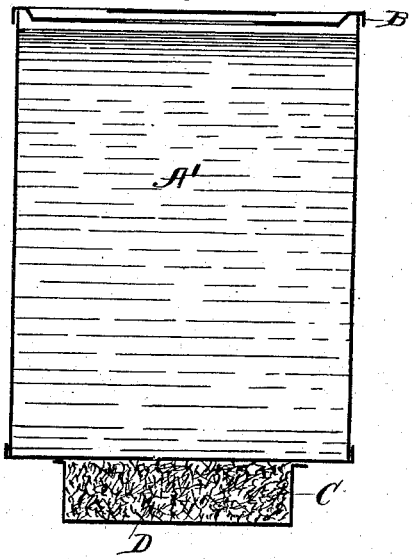
Figure 3:
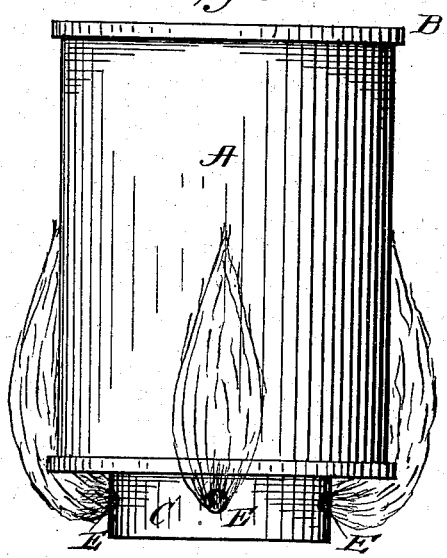
Figure 4:
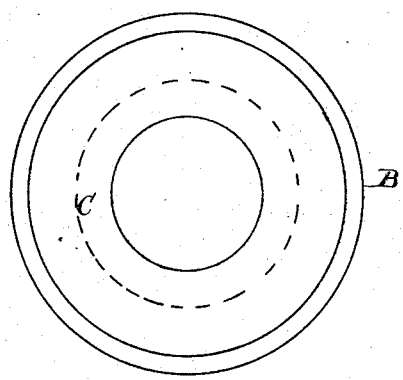
Figure 5:
Figure 6:
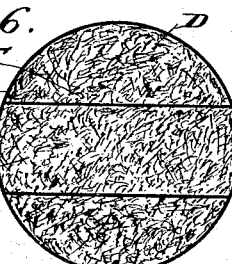

Figure 1 is a front elevation of a vessel constructed according to my invention. Fig. 2 is a longitudinal section of the same, showing the principal vessel with its dietary contents, and the second or ancillary casing filled with combustible matter. Fig. 4 is a plan of the vessel seen from above; and Fig. 3 is an elevation of the same, showing the method of heating the contents of the vessel. Figs. 5 and 6 are cross-sections of the ancillary casing, showing a variation which will be explained hereinafter.

Similar letters of reference denote similar parts throughout the several views.

A is the body of the tin, and B its cover, soldered on after its contents A', which may be milk in its natural state or any other article of diet, as aforesaid, have been placed therein.

C is the casing, soldered onto the tin A and filled with cotton impregnated with liquid fuel or other suitable combustible matter, D. In order to heat the contents of the tin A, the casing C is to be cut in several places, E, and the cotton, having been partially pulled out, is to be kindled. The contents of the tin A, having been thus heated, are suitable for immediate consumption on the spot, without being submitted to any previous culinary process, which in many instances is impracticable, owing to the absolute want of water, or of fuel, or of both, in the place in which the article of diet or medicament is to be consumed.

Within the ancillary casing C one or more pieces of tin-plate or other metal, F F, may be inserted, forming radii, Fig. 5, or chords, Fig. 6, in relation to its circumference, and having for their object to enable the cotton or other combustible matter to be more readily pulled out by means of a pointed instrument.

Having now fully described my invention, I claim as my invention and desire to secure by Letters Patent of the United States—

1. The combination, with a closed vessel or recipient containing the liquid or semi-liquid diet or medicaments, of an attached auxiliary sealed casing containing inflammable matter for heating the contents of the vessel or recipient, substantially as described.

2. The combination, with a closed vessel or recipient containing the liquid or semi-liquid diet or medicaments, of an attached sealed casing provided with partitions and containing inflammable cotton or other combustible matter, substantially as described.

In testimony whereof I have hereunto set my hand and seal in the presence of two subscribing witnesses.

VICTOR MANUEL. [L. S.]

Witnesses:
JOSEPH THEODORE DANN, C. E.,
32 *Canterbury Road, Brixton, S. W., London.*
CHARLES RICKETTS,
4 *Westminster Chambers, S. W., London, gent.*